H. L. WILLIAMS.
MUD CLEANING MECHANISM FOR TRACTOR WHEELS.
APPLICATION FILED MAY 19, 1919.
1,341,093.
Patented May 25, 1920.
2 SHEETS—SHEET 2.
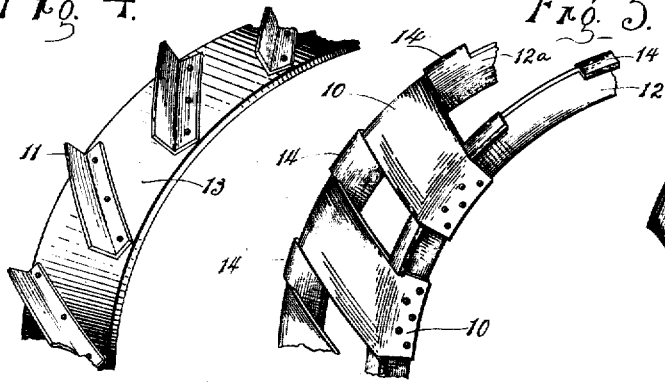
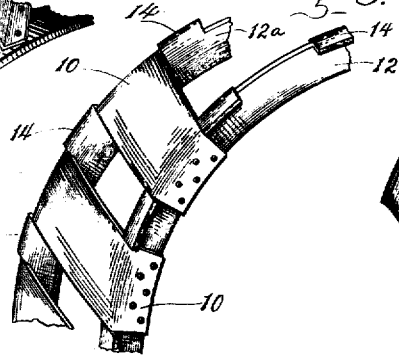
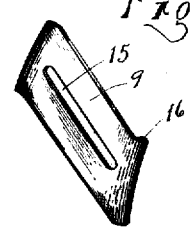
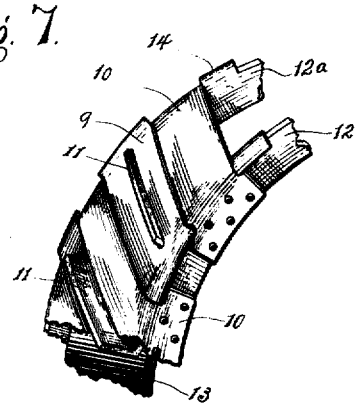
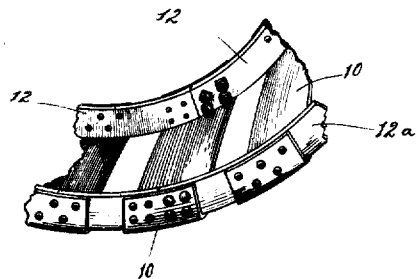
WITNESSES:
INVENTOR.

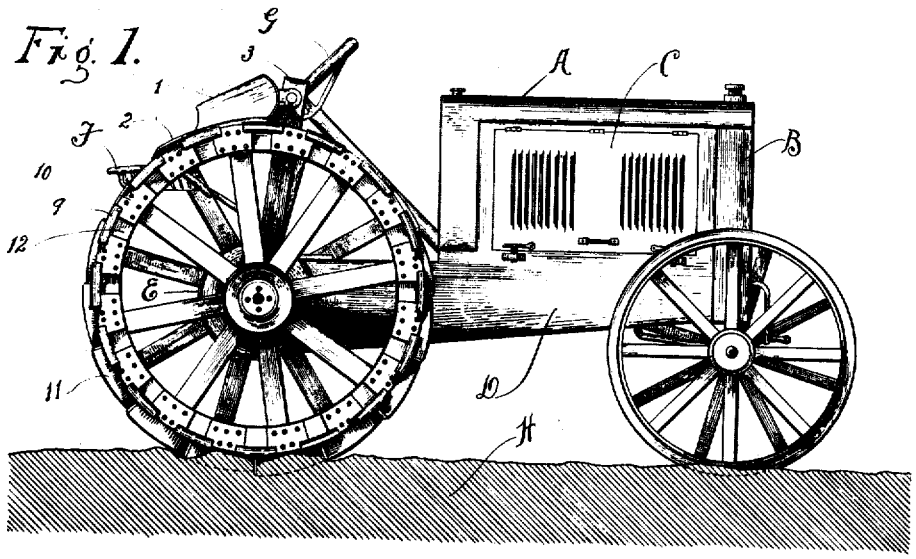
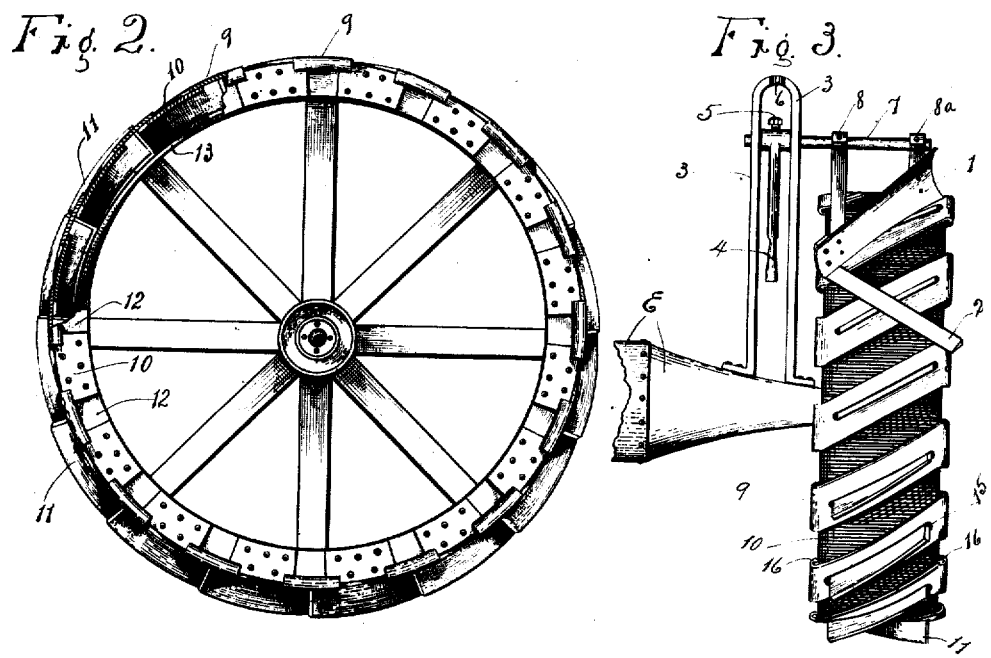
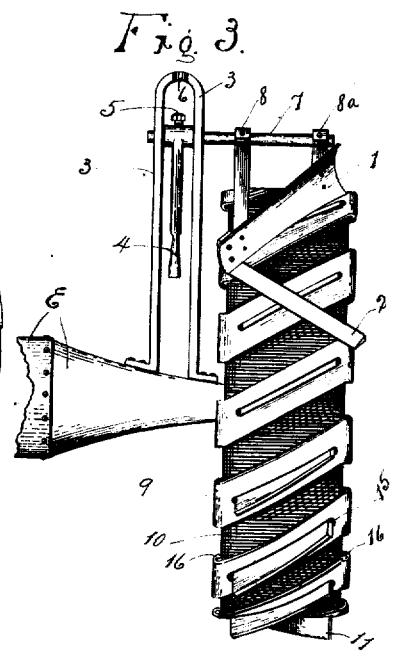

UNITED STATES PATENT OFFICE.

HARTWELL L. WILLIAMS, OF BEAUMONT, TEXAS.

MUD-CLEANING MECHANISM FOR TRACTOR-WHEELS.

1,341,093.   Specification of Letters Patent.   Patented May 25, 1920.

Application filed May 19, 1919. Serial No. 298,117.

*To all whom it may concern:*

Be it known that I, HARTWELL L. WILLIAMS, a citizen of the United States, residing at Beaumont, in the county of Jefferson, and State of Texas, have invented certain new and useful Improvements in Mud-Cleaning Mechanism for Tractor-Wheels, of which the following is a specification.

This invention relates to tractors and more particularly to mud cleaning mechanism for tractor wheels.

The main object of my invention is to provide mechanism whereby mud can be cleaned automatically from and between the cleats or earth clutches and from the rims of tractor wheels while the wheels are in motion.

A further object is to provide mud cleaning mechanism for tractor wheels, of such simple character that it may be easily assembled or disassembled and which shall be simple and durable in construction, positive in action, compact in form and applicable in principle to any of the styles of tractors common in use which depend upon the two rear wheels for traction.

Other objects and advantages will appear in the following description.

My invention is illustrated in the accompanying drawings wherein:

Figure 1 is a side elevation of a tractor, showing the rear power wheels equipped with my mud cleaning mechanism.

Fig. 2 is an enlarged elevation of a tractor wheel equipped with the loose mud rim, of my mud cleaning mechanism.

Fig. 3 is a rear elevation of a tractor wheel equipped with my mud cleaning mechanism.

Fig. 4 shows a portion of a well known tractor wheel now common in use, not equipped with a mud cleaning mechanism.

Fig. 5 shows a skeleton portion of my loose mud rim as modified to receive the cleats on the wheel rim illustrated in Fig. 4.

Fig. 6 shows a sliding plate as modified to fit over the openings in the rim illustrated in Fig. 5.

Fig. 7 shows a portion of mud cleaning mechanism completely assembled without the mud plow and fitted to a portion of a wheel rim.

Fig. 8 is a skeleton portion of my mud rim inverted to show a method of joining the sections together for assembling and disassembling purposes. In this figure to clearly show my idea, I have shown the nuts on the inside of the side rim, in reality they should be on the outside and the bolt heads should be on the inside. I have also omitted the protruding flanges in this figure for clearness.

Corresponding and like parts are referred to in the following description and indicated in all the views of the accompanying drawings by the same reference characters.

My improved mud cleaning mechanism, as stated before, is applicable in principle to any of the styles of tractors common in use which depend upon the two rear power wheels for traction and such a tractor is illustrated in the accompanying drawings, in the figures of which (A) designates the gasolene tank, (B) the radiator, (C) the engine compartment, (D) the crank shaft and steering gear housing, (F) the seat, (G) the steering wheel and (H) a plot of earth.

The plow 1, as best seen in Fig. 3, is swung from a supporting rod 7 this rod 7 is mounted in bearings in the upright frame 3, and is held in place by the bolt 5 in the base or head of the lever 4 and may be turned by this lever providing thereby a means for lifting the plow to an inoperative position when desired. Slot 6 in the upright frame 3 is a rest for lever 4 when the plow is raised and at rest in an inoperative position. The plow 1 is swung from rod 7 by two supporting arms 8 and 8ᵃ and is swung far enough ahead of rod 7 to cause the plow to rest upon the loose rim of its own weight. Bolted to the lower end of plow 1 and extending diagonally across the loose rim is the plow point or runner 2. This point is intended to engage and run upon the top of the loose mud rim allowing the plow wing to come down to the rim but not allowing it to come in contact with the metal plates, this point 2 is also intended to bite or cut into the dirt or mud laying upon the rim and hold the plow steady and firmly upon the rim and at the same time loosening the dirt from the rim. The upright frame 3 is fastened to the axle housing or to the tractor as may best suit the tractor to which it is applied and may be modified accordingly.

In the loose mud rim, 12 and 12ᵃ designate the side rims to each of which are riveted the cross plates 10. These cross plates are spaced far enough apart to allow an opening between them sufficiently large to receive the cleats 11 of the wheel rim 13 in the different positions to which they may play. Protruding from the side rims 12 and 12ª at intervals or from between each opening of the cross plates are bent over flanges 14 on each side rim to act as sliding supports or bases for the curved side holds 16 of the sliding plates 9 which fit over the openings between the cross plates 10. In each plate 9 is a slot 15 into which the cleats 11 fit snugly.

To apply my loose mud rim to tractor wheels having cleats, lugs or earth clutches of different design from those I have illustrated and described in the accompanying drawings and in the specifications, it is understood that the slots and openings of the cross plates and sliding plates may be modified without departing from the principle of my invention or the loose rim may be made solid or of one piece having holes or openings to receive the cleats, lugs or earth clutches of the tractor wheel rim without departing from the principle of my invention. It is preferable, however, to construct my loose rim in three or four sections, joined together, for assembling and disassembling purposes as illustrated in Fig. 8.

The operation of my invention is as follows: In Fig. 1 the mechanism is seen as it would appear on a tractor in operation, the loose mud rims fit entirely around the rear traction wheels. As the tractor wheel is within the loose rim it serves as a continuous track for the tractor wheel, the openings in the loose rim between the cross plates 10, and also the slots 15 in the sliding plates 9 permit the cleats to protrude and sink in the earth to give traction and the tractor wheel keeps the loose rim pinned to the earth at the bottom of the wheel at all times and forces the loose rim to revolve with the tractor wheel and at the same time keeps the top portion of the loose rim raised, in effect, until the cleats are inclosed at the top of the wheel which permits the plow to rest on the flat surface of the loose rim unobstructed by the cleats. As the mud rim has a greater circumference than the tractor wheel it, therefore, fits loosely and as the cleats 11 of the tractor wheel come in contact with and bury themselves in the earth, the earth comes in contact with the loose mud rim and presses it up until it is pinned to the bottom of the tractor wheel rim and is forced to revolve with the tractor wheel and as the cleats continue to sink into the earth through the openings in the loose rim, the loose rim is kept pressed up and against the tractor wheel rim at the bottom constantly which also keeps the top portion of the loose rim raised thereby presenting a flat surface on the top portion of the loose rim on which the plow can operate without any obstruction as the cleats are entirely out of the way of the plow on the top portion of the rim while, on the other hand, they are protruding through the openings in the rim at the bottom and give the desired traction to the wheel. It is now seen, as the mud rim is raised at the top of the wheel, the mud, which accumulated between the cleats while at the bottom or buried in the earth, is now raised from between the cleats and is laying on the flat surface of the mud rim and will be plowed off by the plow as the wheel turns. The mud plow wing is held slightly off of the metal mud rim by the plow point 2 which is between the plow wing and the mud rim, otherwise the plow wing would soon wear out by continually running on the metal mud rim, the plow point 2 which does run on the metal mud rim is bolted to the plow 1 and can be easily replaced when worn out. The plow and point may be raised until lever 4 rests in slot 6 of the upright frame 3 thereby throwing the plow to an inoperative position when desired. As the loose mud rim is raised at the bottom by the earth when the cleats bury themselves in the earth, it is clear that wide enough openings must be provided between the cross plates 10 to prevent these cross plates from binding the cleats on the right and left horizontal diametrical points of the wheel rim as the loose rim is raised. These openings are covered by sliding plates 9 each having a slot 15 through which the cleats protrude and as the mud rim is raised or lowered these plates 9, being held by the cleats, slide on the surface of the mud rim leaving it free to be raised or lowered but still keep the openings in the mud rim covered preventing any mud from entering.

What I claim is:

1. A mud cleaning mechanism for cleated tractor wheels including a loose rim, of somewhat greater circumference than and adapted to fit loosely around the tractor wheel to which it is applied, operatively connected to the tractor wheel so as to revolve with it, and having openings covered by slidingly connected sliding plates, said plates having slots to receive and allow the traction cleats to protrude for traction, means for cleaning mud from the loose rim surface as the tractor wheel and loose rim revolve.

2. A mud cleaning mechanism for cleated tractor wheels including a loose rim of greater circumference than the tractor wheel to which it is applied, adapted to revolve as the tractor wheel revolves, and having openings spaced around the loose rim at intervals and covered by sliding plates having slots to receive the traction cleats of the tractor wheel, side rims constructed on each side of the loose rim so as to fit over the tractor wheel rim edges and prevent mud from entering at the sides and accumulating between the loose rim and the tractor wheel rim surface and, at the same time, providing an additional means for holding the loose rim on the tractor wheel.

3. A mud cleaning mechanism for cleated tractor wheels including a loose rim, of greater circumference than the tractor wheel to which it is applied, operating loosely around and revolving with the tractor wheel, said loose rim having openings to receive the traction cleats, sliding plates slidingly connected to the loose rim and covering the openings in the loose rim and having slots to receive the traction cleats of the tractor wheel rim.

4. A mud cleaning mechanism for cleated tractor wheels including a loose rim of greater circumference than the tractor wheel to which it is applied, operatively connected to and adapted to revolve with the tractor wheel, said loose rim having openings covered by sliding plates, said plates provided with slots to receive the traction cleats, side rims on each side of the loose rim fitting over the tractor wheel rim edges, said side rims provided with lugs at intervals to form suitable sliding bases for slidingly connected sliding plates which operate slidingly on the surface of the loose rim.

5. A mud cleaning mechanism for cleated tractor wheels including a loose rim having side rims and cross plates, said cross plates riveted to the side rims and spaced to provide openings large enough to receive the traction cleats of the tractor wheel, sliding plates, with slots to receive the traction cleats, said plates covering the openings provided between the cross plates and having bent over ends to slidingly engage suitable lugs on the side rims.

6. In a mud cleaning mechanism for cleated tractor wheels, the combination with a loose rim of greater circumference than and adapted to revolve with the tractor wheel to which it is applied, of a plow wing swung from a suitable supporting frame, so as to rest of its own weight upon the surface of the loose rim, a point or runner bolted to the plow wing, said runner engaging and extending across the surface of the loose rim ahead of said plow wing so as to cut mud away from the surface of the loose rim ahead of the wing and at the same time adapted to hold the plow wing slightly off of the surface of the loose rim, means for shifting the plow wing and runner to an inoperative position when desired.

7. In a mud cleaning mechanism for tractor wheels, the combination with a loose rim of greater circumference than and adapted to revolve with the tractor wheel to which it is applied, of a plow supporting frame having bearings to house a plow wing supporting rod, a plow wing swung from said supporting rod so as to rest of its own weight upon the surface of the loose rim, a runner attached to the plow wing so as to extend diagonally across and cut mud away from the surface of the loose rim ahead of the plow wing, a lever attached to the plow wing supporting rod, said lever adapted to shift the plow wing and runner to an inoperative position.

In testimony whereof I affix my signature in presence of two witnesses.

HARTWELL L. WILLIAMS.

Witnesses:
F. H. HANEY,
CARL M. PEARCY.